United States Patent [19]

Schmitt et al.

[11] 3,716,843

[45] Feb. 13, 1973

[54] MODULAR SIGNAL PROCESSOR

[75] Inventors: Joseph W. Schmitt, Hudson; Donald L. Starkey, Amherst, both of N.H.

[73] Assignee: Sanders Associates, Inc., Nashua, N.H.

[22] Filed: Dec. 8, 1971

[21] Appl. No.: 206,070

[52] U.S. Cl. ................................................ 340/172.5
[51] Int. Cl. ................................................ G06f 15/16
[58] Field of Search .................................... 340/172.5

[56] References Cited

UNITED STATES PATENTS

| | | | |
|---|---|---|---|
| 3,287,703 | 11/1966 | Slotnick | 340/172.5 |
| 3,473,160 | 10/1969 | Wahlstrom | 340/172.5 |
| 3,579,201 | 5/1971 | Langley | 340/172.5 |
| 3,631,401 | 12/1971 | Dinman | 340/172.5 |
| 3,681,761 | 8/1972 | Schuenemann | 340/172.5 |

*Primary Examiner*—Paul J. Henon
*Assistant Examiner*—Sydney R. Chirlin
*Attorney*—Louis Etlinger

[57] ABSTRACT

A modular signal processor which is assembled from a set of modules which have common input and output timing specifications such that any one module can be interconnected with any other module to perform a desired signal processing operation under the control of a timing generator. The timing generator is arranged to produce a clock signal of relatively high frequency and sequences of timing signals at a relatively lower frequency. Data is loaded into a module in response to a first one of the timing signal. The module then performs its operation or function upon the data to provide a result data. The result data is then read from the module in response to a subsequently occurring timing signal which is also employed to load the result data into another module. Specifically disclosed herein is a frequency synthesizer processor which employs the following modules: binary coded decimal to binary converter, phase accumulator, look up table and a digital to analog converter and filter.

4 Claims, 9 Drawing Figures

MODULAR SIGNAL PROCESSOR

BACKGROUND OF INVENTION

1. Field of Invention

This invention relates to new and improved signal processing apparatus and in particular to a signal processor which employs a plurality of relatively complex functional modules interconnected to perform a desired operation.

2. Prior Art

Signal processor designs consisting of an interconnection of relatively complex functional modules have been previously employed. For example, analog signal processors for many years have employed the operational amplifier as a basic building block or functional module for such complex computational functions as integration, differentiation, multiplication, squaring and many others. The use of the operational amplifier building block has allowed the design of analog signal processors almost entirely from block diagrams. That is, the signal processor equipment can be assembled with operational amplifier modules without resort to detailed circuit schematics of those modules.

On the other hand, the basic building blocks (logic gates, adders, registers, counters, decoder, multiplexers and the like) for digital signal processors are more basic or elemental in nature. This has resulted in new design efforts for each new application which arises. In addition, it has not been uncommon to find different designs of the same complex functions even within a single system. This type of design effort is time consuming, complex and expensive.

It has been proposed in U.S. Pat. No. 3,576,432 to employ as a basic building block an arithmetic module which operates upon data in pulse coded format (pulse trains). However, it is difficult to interface the pulse coded format data with the conventional non-return-to-zero (NRZ) data format generally employed in digital computers. In addition, computations performed upon pulse coded numbers are time dependent since the coded numbers are functions of time. This results in relatively long and nonuniform computation times.

BRIEF SUMMARY OF THE INVENTION

An object of this invention is to provide new and improved signal processing apparatus.

Another object is to provide a new and improved modular signal processor.

Still another object is to provide a modular processor in which the modules are designed with common interface specifications so as to allow any one of the modules to be interconnected with any of the other modules.

Yet another object is to provide a modular processor with modules having common interface specifications such that the processor can be assembled almost entirely from a block diagram.

In brief, apparatus embodying the present invention includes a family of modules which have substantially the same interface specifications such that any family member can be interconnected with any other family member to perform a desired operation under the direction of a common control unit. The common control unit is embodied in a timing generator which produces a clock signal with a relatively high frequency and further produces sequences of timing signals at a lower frequency. Each of the modules in the family includes an input register, an output register, a function generator and a timing section. The timing section in each module includes a first means responsive to a first one of the timing signals and to the clock signal to load the corresponding input register with input data and a second means also responsive to the clock signal to cause the corresponding module function generator to perform its operation on the input data so as to provide a first result data and to load the result data into the corresponding module output register. The timing section further includes a third means responsive to a subsequent one of the timing signals and to the clock signal to read the data result from the module output register. Two or more modules are interconnected into a system by reading the data output results of one module and loading it into the input register of another module in response to the same timing signal. Preferably, in order to keep the module input and output lead at a minimum, the data is processed serial by bit. In some cases, it is preferable to enhance the speed of operation by allowing data transfers from one module to another to occur bit serial and byte parallel.

BRIEF DESCRIPTION OF THE DRAWINGS

In the accompanying drawings like reference characters denote like elements of structure, and.

DESCRIPTION OF PREFERRED EMBODIMENT

Figure 1:
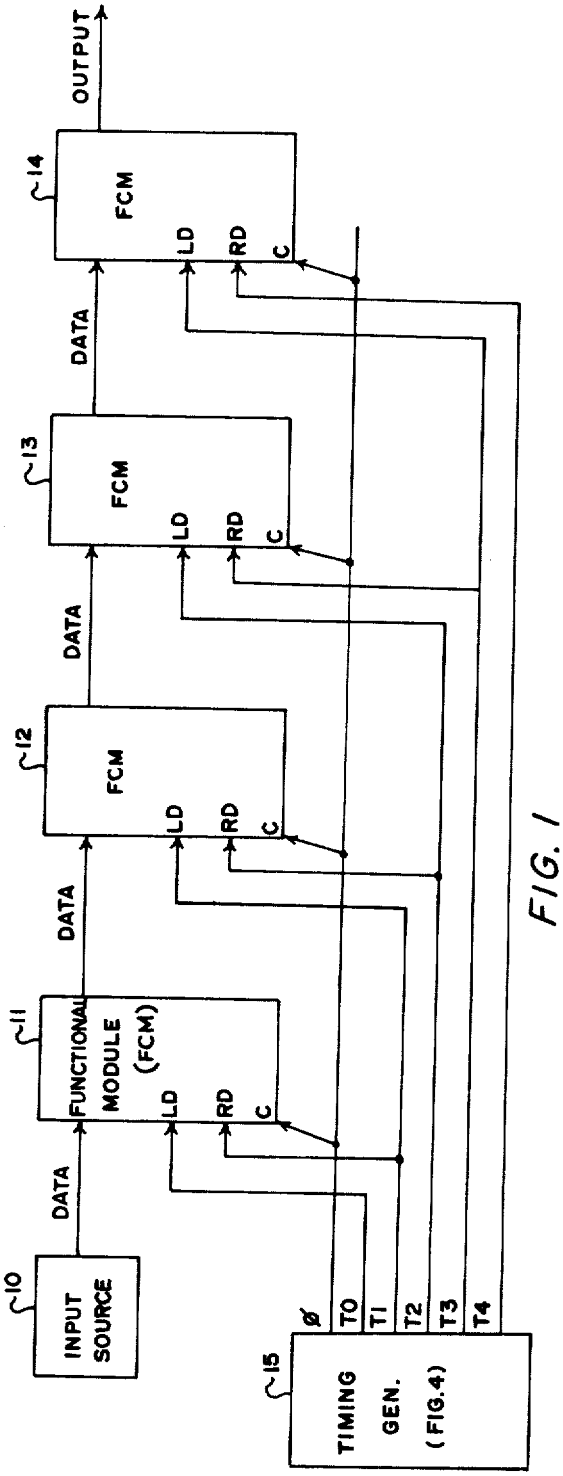
FIG. 1 is a block diagram of a modular processor embodying the present invention.
Figure 2:
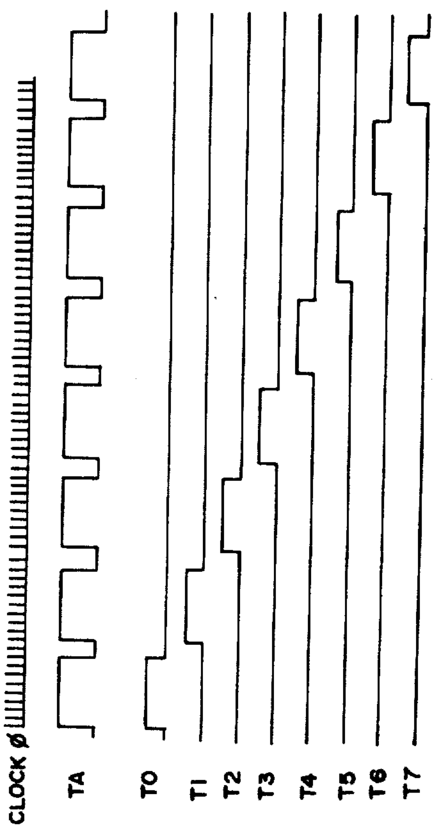
FIG. 2 is a waveform diagram of the timing signals employed in the FIG. 1 modular processor.

Referring to FIG. 1, signal processor apparatus embodying the invention includes a plurality of functional modules (FCM's) 11, 12, 13 and 14 which are interconnected to perform a desired signal processing operation under the direction of a control unit or timing generator 15. The timing generator 15 provides a relatively high frequency clock signal $\phi$ to a clock terminal C of each of the modules. The timing generator 15 also produces at a lower frequency sequences of timing signals designated in FIG. 1 as T0 through T4, the waveforms of which are shown in FIG. 2.

Each of the modules is arranged to receive a first one of the timing signals at a load (LD) input and a subsequently occurring one of the timing signals at a read (RD) input. Input data is then loaded into a module when its LD input is active. The module then performs its function or operation upon the input data to provide a result data. The result data is then read from the module when its RD terminal subsequently becomes active. In general, where a first module is connected to apply its result data to the data input of the second module, the same timing signal is employed to read the first module and to load the second module.

Figure 3:
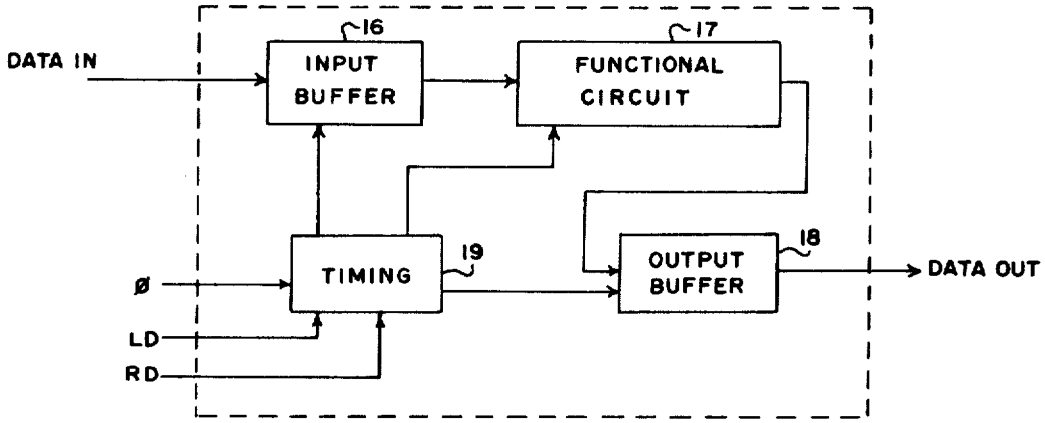
FIG. 3 is a block diagram showing the main components contained within each of the functional modules which make a modular processor.

Each of the modules is shown in FIG. 3 to include an input buffer 16, a functional circuit 17, an output buffer 18 and a timing section 19. The timing section 19 responds to the clock signal C and to the timing signal at its LD input to load the input buffer 16 with input data applied at the data input. The timing section 19 also responds to the clock signal C to cause the functional circuit 17 to perform its function upon the data contained in the input buffer 16 so as to provide a result data to an output buffer 18. Timing section 19 includes further means responsive to the clock signal $\phi$ and to the timing signal applied to the RD input to read the result data from the output buffer 18.

By employing the generalized functional module of FIG. 3, it is possible to design a variety of modules which perform different functions and which can be employed to design a signal processor system. For example, modules can be designed to perform multiplication, integration, table look up operations, A/D conversion, D/A conversion, decimal to binary conversion, envelope detection, scaling and limiting operations, and many other functions. Signal processing systems which can be implemented with functional blocks such as the foregoing include spectrum analyzers, frequency synthesizers and many others.

In general, the input and output buffers 16 and 18 of the functional module include a temporary storage device such as a register. However, the input and/or the output buffer may be omitted from some functional block such as an A/D converter or a D/A converter. The functional circuit 17 includes the logic gates, flip flops, adders, registers and other digital signal processing elements which are required to perform the function or operation of the module. The timing section 19 differs from one module to another to the extent that the functional circuit 17 requires different timing functions.

Turning again to FIG. 1, the functional modules 11, 12, 13 and 14 are shown to be interconnected in series cascade, in the named order, by way of example only. For instance, a system designer could just as well connect the modules in various series, parallel and branching combination to achieve his desired design. The functional module 11 receives data input from an input source 10. Input source 10 may be any suitable source which provides data in a non-return to zero (NRZ) form such as a computer, a computer I/O device, and the like.

Figure 4:
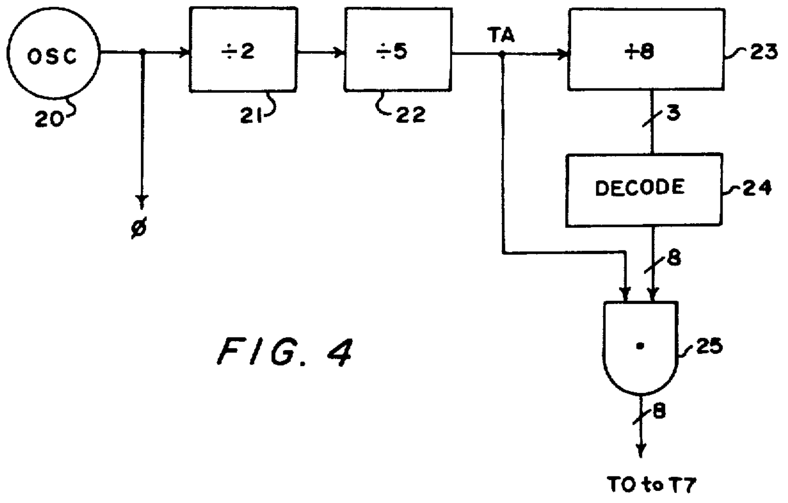
FIG. 4 is a block diagram of an exemplary timing generator which may be employed in the modular processor.

With reference now to FIG. 4, an exemplary timing generator is shown to include an oscillator 20 which provides the clock signal $\phi$. A divide by two network 21 and a divide by five network 22 operate upon the clock signal $\phi$ to provide timing enable signal TA. As shown in the waveform diagram of FIG. 2 the TA signal has a ten clock pulse long cycle and is high for eight of the pulses and low for the next two pulses. The TA signal is further operated upon by a divide by eight network 23 to provide a three bit code. The three bit code is represented in FIG. 4 by a single connection with a slash mark through it with the numeral adjacent thereto. The three bit code is decoded by a decoder 24 to provide signals on eight leads to an AND gate network 25. Though shown as a single gate, the network 25 actually includes a separate AND gate for each of the eight inputs from decoder 24. The TA signal is applied as an input to each of the eight AND gates such that the output of the gating network 25 consists of the eight timing signals T0 through T7.

The circuit blocks shown in FIG. 4 and the remaining FIGURES of the drawing contain known circuits which are actuated by bi-level electrical signals applied thereto. When the signal is at one level, (say, the high level) it represents the binary digit 1 and when it is at the other level it represents the binary digit 0. Also, to simplify the discussion, rather than speaking of an electrical signal applied to a block or logic stage, it is sometime stated that a 1 or a 0 is applied to the block or stage.

The decoder, flip flop, adder, and logic gates or blocks shown in the drawing may take on any suitable form. For example, these known circuits may be selected from any or all of the following catalogs: Fairchild, TTL Family, October, 1970, a catalog of Fairchild Semiconductor, a Division of Fairchild Camera and Instrument Corp.; TTL Integrated Circuits Catalog from Texas Instruments, catalog CC201-R, a catalog of Texas Instruments Inc.; Digital Integrated Circuits, 1971, a catalog of National Semiconductor Corp. of Santa Clara, California.

Coincidence gates represented in the drawing with the conventional AND gate symbol having a dot therein and OR gates are represented by the conventional OR gate symbol with a + contained therein. A small circle at the output of these gates represents signal inversion just as the AND and OR gates become NAND and NOR gates, respectively. When a signal flow path contains more than a single lead or conductor, a slash mark is made through the path together with an adjacent number indicating the number of conductors in the path. Although only single gates are illustrated in the drawings, each such gate is in reality a gating network having a number of gates equal to the number of signal leads in the signal flow path. The AND gating network 25 in FIG. 4 is an example of this which has been previously described. One final note before proceeding with the description, the signal leads have in some cases been interrupted and labeled rather than shown as continuous leads so as to avoid cluttering in the drawing.

Figure 5:
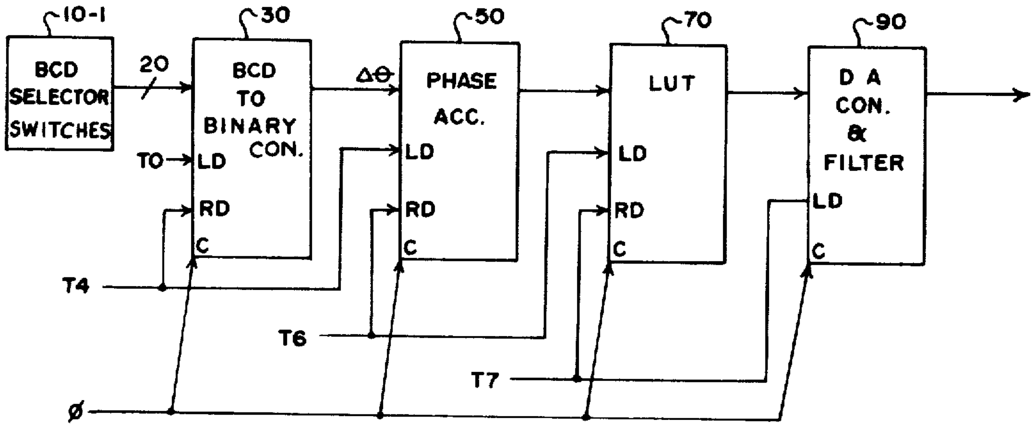
FIG. 5 is a block diagram of a frequency synthesizing signal processor which embodies the present invention.

By way of example and completeness of description, there is shown in FIG. 5 a block diagram of a frequency synthesizer which can be constructed with four of the basic functional modules. As shown in FIG. 5, the input source for the frequency synthesizer takes the form of a set of binary coded decimal (BCD) selector switches 10-1. The source 10-1, for example, includes a separate manually operable BCD selector switches for the units, 10's, 100's, 1,000's, 10,000's digits of the selected frequency.

The selected frequency value is loaded into the first module 30 at time T0. The first module 30 is arranged to perform a BCD to binary conversion. In order to allow sufficient time for the signal conversion to occur, the data result or binary equivalent of the selected frequency value is not read from the module 30 until time T4. When the binary equivalent of the selected frequency value is read from module 30 at time T4 it is also loaded into the second module 50 which is a phase accumulator.

The selected frequency value is essentially the angular value $\Delta\theta$ in the equation $f=(1/2\pi)(\Delta\theta/\Delta t)$, where $(\Delta\theta/\Delta t)=w$, the angular velocity. The phase accumulator 50 is then operable over a multiplicity of timing sequences to perform a continuous accumulation of values modulo $2^2$, where $n$ is the number of bits in the binary output of the module 30. Thus, for the present example, where $n=16$, the phase accumulator 50 performs a continuous accumulation of values modulo $2^{16}$. Accordingly, during each timing signal sequence at time T6 a present accumulated value is read from the phase accumulator 50 and loaded into the next module 70 which is a look up table (LUT).

The look up table 70 essentially performs an angle to sine conversion in that it accepts the present accumulated value from the phase accumulator 50 and calculates sin $[(\theta/2]16 \times 2\pi)$. The sine values computed over the multiplicity of timing signal sequences represent different sample values of a sine wave, the frequency of which is directly set on the BCD switches.

At time $T_7$ in each of the timing signal sequences, the present sample value is read out of the LUT 70 and loaded into a D/A converter and low pass filter module 90. The D/A converter and filter accepts the output samples of the LUT and converts these binary samples to an analog voltage proportional to the sample values. A low pass filter following the converter removes the sampling frequency and higher components so as to produce a relatively pure sine wave, the frequency of which is directly set on the BCD switches 10–1.

Figure 7:
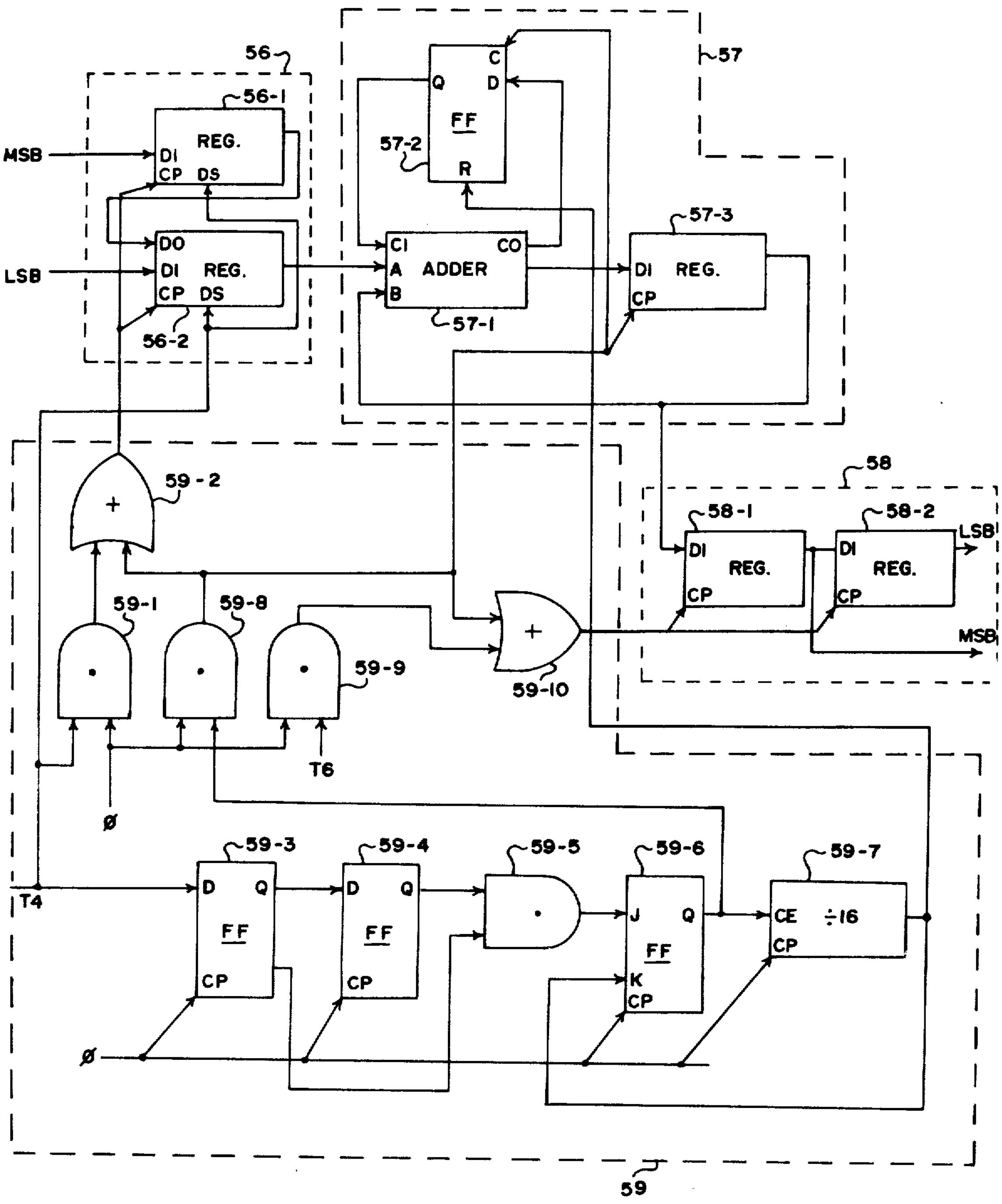
FIG. 7 is a block diagram, in part, and a logic schematic, in part, of the phase accumulator module which may be employed in the FIG. 5 processor.
Figure 8:
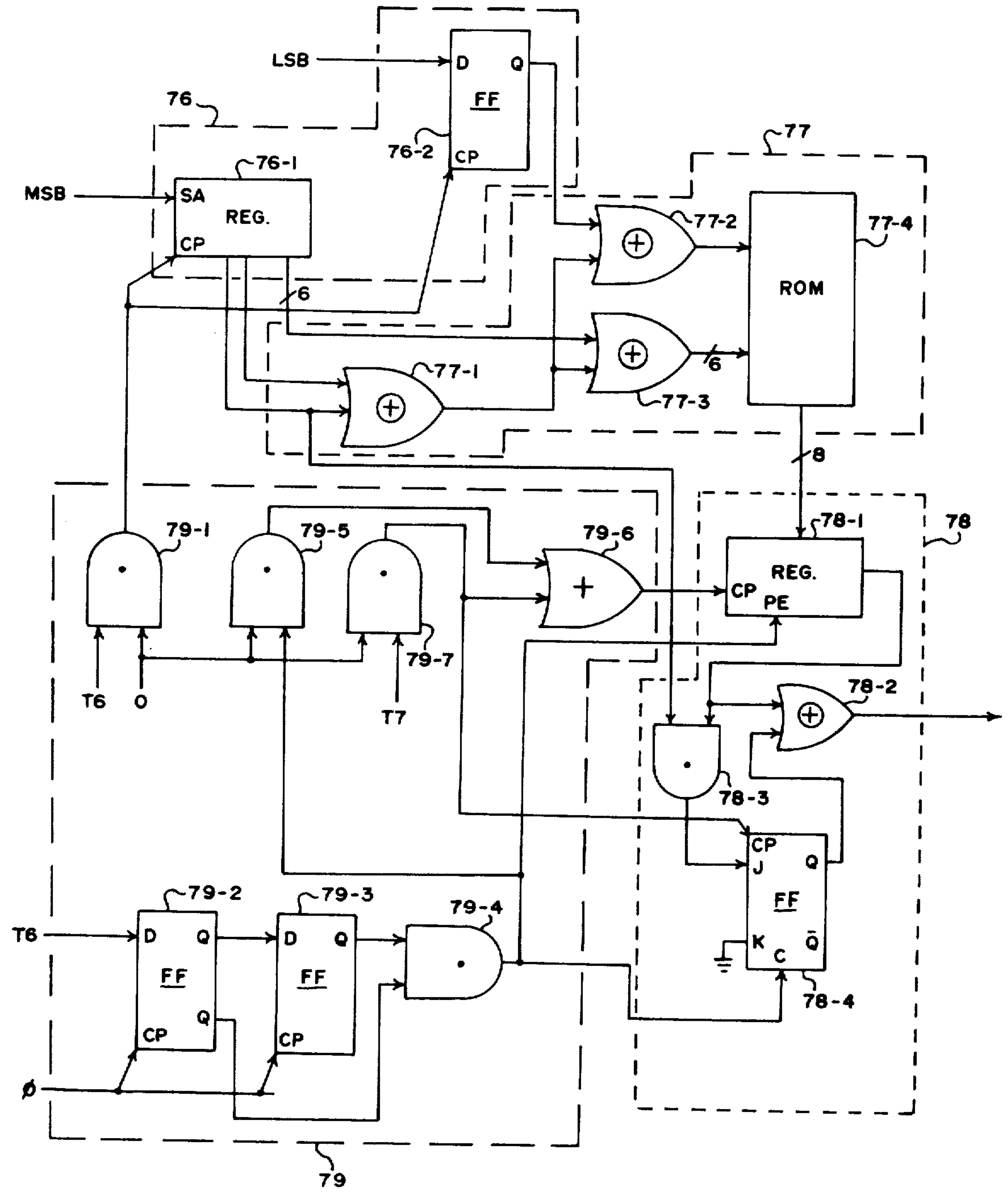
FIG. 8 is a block diagram, in part, and a logic schematic, in part, of a look up table module which may be employed in the FIG. 5 processor.
Figure 9:
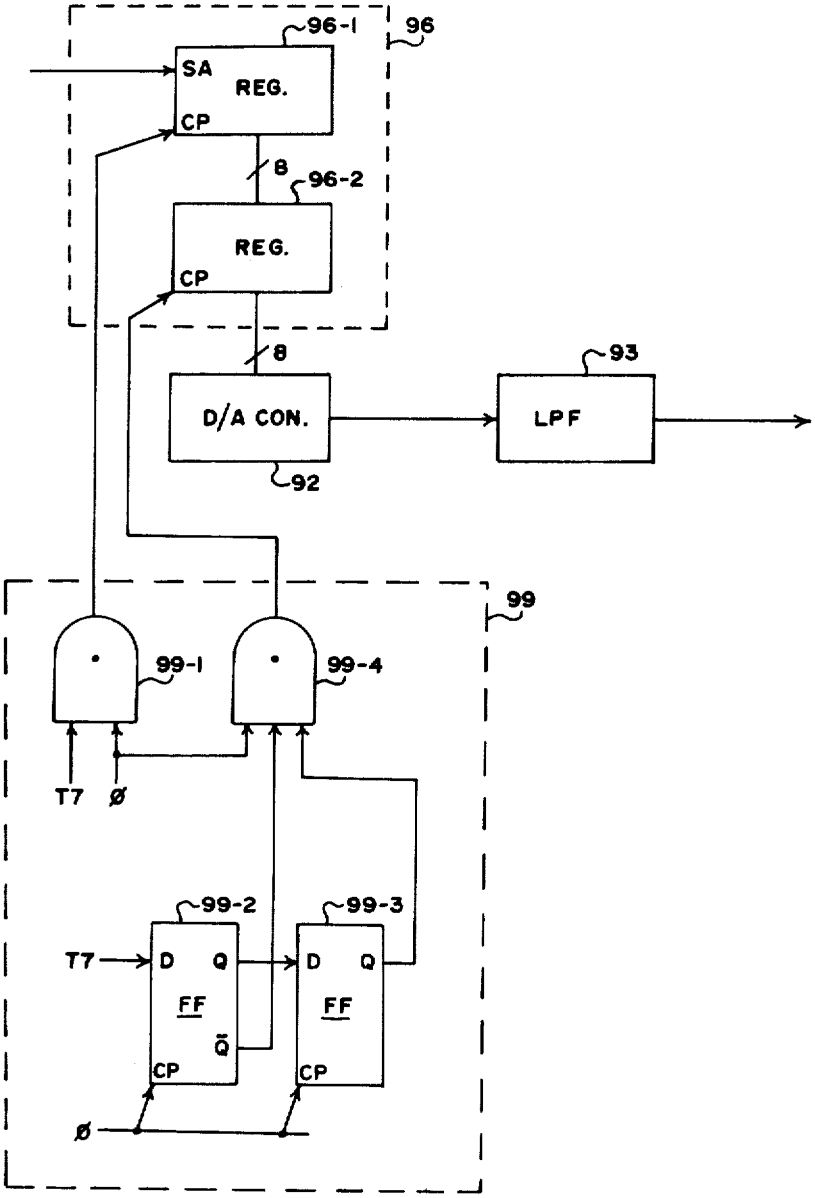
FIG. 9 is a block diagram, in part, and a logic schematic, in part, of a D/A converter and filter module which may also be employed in the FIG. 5 frequency synthesizing processor.

The modules 30, 50, 70 and 90 are illustrated in greater detail in FIGS. 7, 8, and 9 respectively. In these illustrations, the input and output buffers, the functional circuit and the timing section bear the same units reference character as in the basic module block diagram of FIG. 3.

Figure 6:
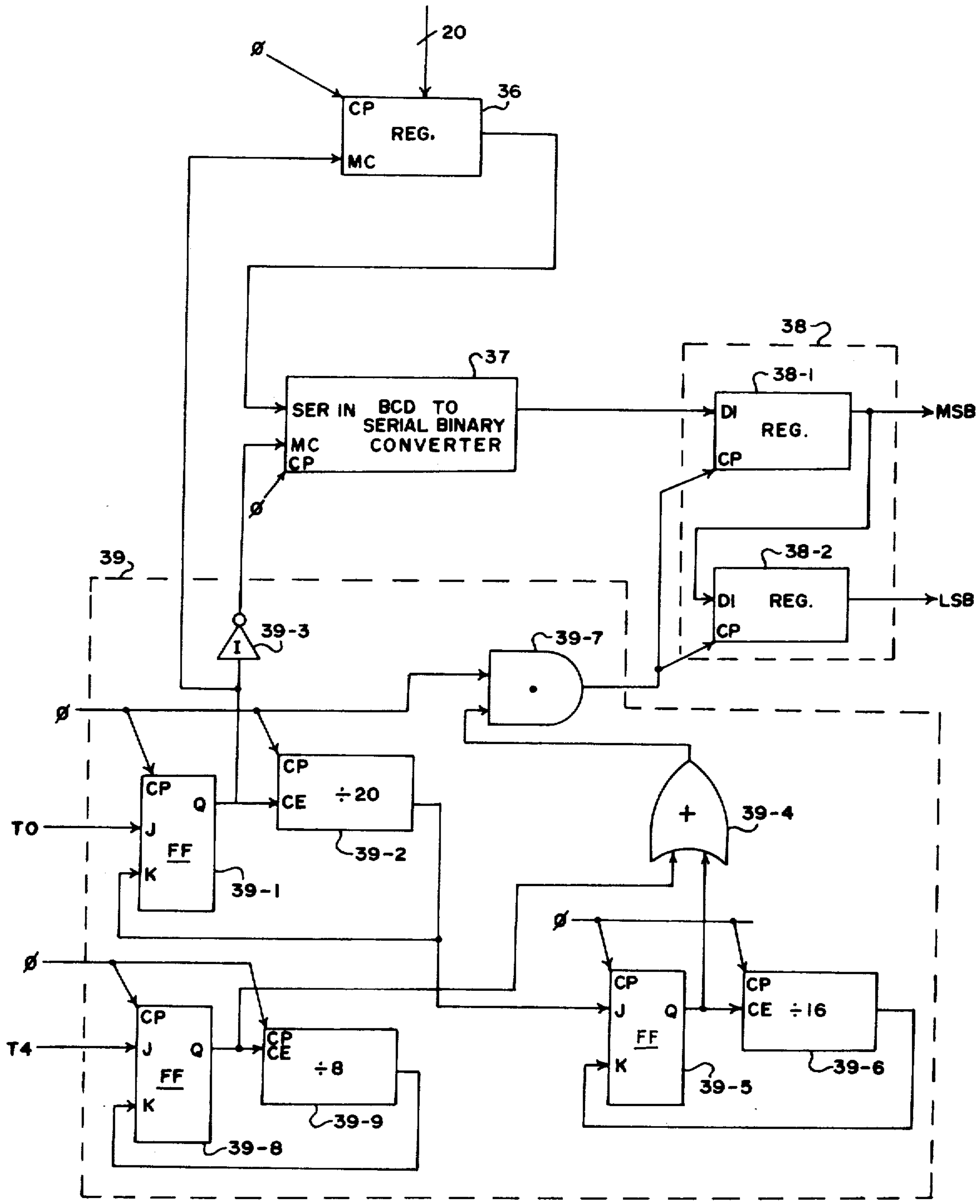
FIG. 6 is a block diagram, in part, and a logic schematic, in part, of a BCD to binary conversion module which may be employed in the FIG. 5 processor.

Turning now to the BCD to binary converter diagram shown in FIG. 6, an input buffer 36 takes the form of a register which accepts the 20 bit BCD frequency value in parallel when the input to its mode control (MC) is a zero. The timing section 39 includes a JK flip flop 39–1 which responds to the T0 timing signal at its J input to provide a 1 at its Q output in response to the next occurring clock pulse. The Q output of Flip flop 39–1 is connected to the count enable (CE) input of a divide by 20 network 39-2 which is operable to provide a clock pulse count of 20. After 20 clock pulses the output of the divider 39–2 becomes a 1 and is applied to the K input of the flip flop 39–1 so as to cause it to change states on the next occurring clock pulse. Thus, the Q output of flip flop 39–1 responds to the T0 timing signal to become a 1 for 20 clock pulses. The Q output is coupled to the MC input of the input buffer register 36 so as to allow the register to shift in response to the next 20 clock pulses the 20 bit BCD value to the serial input of a BCD to serial binary converter 37.

Also at this time, the Q output of flip flop is inverted by means of an inverter 39–3 so as to apply to 0 to the MC input of the converter 37 to thereby allow the 20 bit BCD value to be shifted serially into the converter in response to the 20 clock pulses. The BCD to serial binary converter may take on any suitable design and may, for example, be of the design shown in FIG. 9.42, page 241 of the book entitled Designing with TTL Integrated Circuits, McGraw-Hill Book Co., 1971. At the end of the 20 clock pulses, the flip flop 39–1 changes state so that the input register 36 returns to a parallel load mode and the BCD to binary converter 37 changes to a shift out or conversion mode.

At the end of the 20 clock pulses, the 1 at the output of divider 39–2 is applied to the J input of a flip flop 39–5. Flip flop 39–5 then responds to the next occurring clock pulse to provide at its Q output a 1 which enables a divide by 16 network 39–6 and an AND gate 39–7 via an OR gate 39–4. The divide by 16 network establishes a 16 clock pulse count by means of feeding its last stage output to the K input of flip flop 39–5. This causes flip flop 39–5 to change its state after 16 clock pulses have been applied to the divider 39–6 and to the AND gate 39–7.

The 16 clock pulses which appear at the output of the AND gate 39–7 are employed to clock the 16 bit serial binary value at the output of BCD binary converter 37 into the output buffer 38. The output buffer 38 takes the form of a pair of eight bit registers 38–1 and 38–2 which are arranged in cascade. The D1 inputs of these two registers represent the serial data inputs. The two eight bit registers are employed so as to enhance data transfer between the modules by transferring the date serial by bit and parallel by byte, where a byte is equivalent to eight bits in this example. The outputs of registers 38–1 and 38–2 are designated MSB (most significant byte) and LSB (least significant byte), respectively. At the end of the 16 clock pulses, the sixteen bit serial binary value from converter 37 has been shifted into the registers 38–1 and 38–2.

The T4 read signal is applied to the J input of a JK flip flop 39–8. When the T4 signal becomes a 1, flip flop 39–8 responds to the next occurring clock signal to enable a divide by eight network 39–9 and to reenable the AND gate 39–7 via OR gate 39–4. The divide by eight network establishes a period of eight clock pulses by applying its output to the K input of flip flop 39–8. That is, the Q output of flip flop 39–8 will be a 1 only for eight clock pulses. The AND gate 39–7 will then be enabled to pass eight clock pulses to the register 38–1 and 38–2 so as to clock or shift their respective eight bit contents serially to the phase accumulator module 50.

The input buffer 56 of the phase accumulator module is shown in FIG. 7 to include a pair of eight bit registers 56–1 and 56–2 which are arranged to receive the two bytes of the binary value from the BCD to binary converter module 30. To this end, the T4 timing signal is employed to enable an AND gate 59–1 in the timing section 59 to pass the clock signal $\phi$ via an OR gate 59–2 to the clock input CP of both input registers 56–1 and 56–2. The T4 timing signal is also applied to the data select DS inputs of both registers 56–1 and 56–2. When the value of the signal T4 is a 1, data is enabled to be entered into the respective registers via the D1 data entry input. On the other hand, when the value of the T4 signal is a 0, data is enabled to enter via the D0 input. The D0 input for register 56–1 is not used and is therefore not shown. The D0 input for register 56–2 is employed to receive the serial bit stream output of the register 56–1 when the data is shifted to the phase accumulating circuit 57.

When the T4 timing signal first becomes a 1, the D input of a D type flip flop 59–3 responds thereto on the next ensuing clock pulse such that its Q output becomes a 1. Another D type flip flop 59–4 responds to the 1 at the Q output of flip flop 59–3 on the next ensuing clock pulse to cause its Q output to apply a 1 to an input of an AND gate 59–5. However, the AND gate 59–5 is not enabled at this time since the $\bar{Q}$ output of flip flop 59–3 is a 0. At the termination of the T4 timing signal a 0 will be applied to the D input of flip flop 59–3. On the next ensuing clock pulse flip flop 59–3 will change its state so as to enable the AND gate 59–5. The AND gate 59–5 will remain enabled for one clock pulse since on the next ensuing clock pulse, flip flop 59–4 will also change state such that its Q output will assume a 0. During the one clock time that AND gate 59–5 is enabled, a 1 will be applied to the J input of flip flop 59–6. On the next ensuing clock pulse flip flop 59–6 will switch such that its Q output becomes a 1. This will enable an AND gate 59–8 and a divide by 16 network 59–7. The network 59–7 essentially serves to set up a 16 clock pulse interval. Upon receipt of the sixteenth clock pulse by network 16, its output will become a 1 which is applied to the K input of flip flop 59–6. On the next ensuing clock pulse, the Q output of flip flop 59–6 will become a zero so as to disable AND gate 59–8. Thus, AND gate 59–8 will be enabled to pass 16 clock pulses via OR gate 59–2 to the input buffer 56 so as to clock the 16 bit binary value serially out of the registers 56–1 and 56–2 to the phase accumulator circuit 57.

The phase accumulator network 57 is arranged to perform a continuous accumulation of values modulo $2^{16}$. To this end, the network 57 includes an adder, 57–1 which performs an addition serial by bit upon the binary value from input buffer 56 and the value contained in an accumulator register 57–3 and outputs the sum or result to the accumulator register 57–3. The carry output CO of the adder 57–1 is applied to the D input of a carry flip flop 57–2, the Q output of which is applied as the carry in CI input of the adder 57–1. The carry flip flop 57–2 and the accumulator register 57–3 are clocked by the 16 pulses which appear at the output of AND gate 59–8. These same clock 16 clock pulses are applied via an OR gate 57–10 to the clock terminal CP of the output registers 58–1 and 58–2 contained in the output buffer 58. Thus, at the end of the 16 clock pulses the phase accumulator 57 has computed a new value modulo $2^{16}$; and this value has been loaded into the output registers 58–1 and 58–2.

Subsequently the T6 timing signal becomes a 1 so as to enable AND gate 59–9 to pass the clock signal $\phi$ via an OR gate 59–10 to clock or shift the accumulated value out of the output buffer 58 serial by bit and parallel by byte to the look up table module 70.

Referring now to FIG. 8, the MSB byte of the phase accumulator output is applied to the serial input SA of a serial input and parallel output register 76–1 included in the input buffer 76 of the LUT. The eight serial bits of this byte are shifted into the register 76–1 under the control of the LUT timing section 79. To this end, the timing section 79 includes an AND gate 79–1 which is enabled by the T6 timing signal to pass the clock pulses to the CP clock input of the register 76–1. Thus, when the T6 timing signal terminates, the input register 76–1 will have been loaded with the MSB byte.

At the same time that the MSB byte is being loaded into the input register 76–1, the LSB byte is being serially applied to the D input of a flip flop 76–2 which is also being clocked by the output of the AND gate 79–1. Accordingly, at the end of the T6 timing signal, the D flip flop 76–2 will have assumed the state of the last bit value of the LSB byte.

The eight bit output of the register 76–1 and the single bit output of the flip flop 76–2 are combined in the look up table network 77 by means of Exclusive Or gate 77–1, 77–2 and 77–3 so as to form a seven bit address which is applied to a read only memory 77–4. The table look up memory 77–4 has stored therein the phase vectors for sampled data values computed for a fundamental sinusoidal wave. The phase vectors represent the amplitude of a sample sinusoidal wave at each of $2^m$ equidistant phase points. To synthesize the lowest frequency, all $2^m$ phase vectors are sequentially read out of the memory at equidistant time intervals (T, where T is the period of a single timing sequence). This sequence is then completed in an interval of $2^m$ T and the frequency of the lowest frequency synthesized is given by $f =(1/2^m)T$. This lowest frequency corresponds to the fundamental frequency. Harmonics of the fundamental frequency are synthesized by employing only selected ones of the phase vectors as a series and repeating the selected series a number of times during the interval $2^mT$ to correspond to the harmonic frequency desired.

Accordingly, the value addressed and read out of the memory 77–4 during a particular timing sequence represents the amplitude of one sample of a sinusoidal wave. The addressed value is loaded into a register 78–1 and the output buffer 78 under the control of the timing section 79. To this end, the timing section 79 includes a D type flip flop 79–2, the D input of which receives the T6 timing signal. On the first clock pulse after T6 assumes a 1 value, flip flop 79–2 becomes set so that its Q output becomes a 1 and its $\bar{Q}$ output becomes a zero. On the next ensuing clock pulse the Q output of flip flop 79–2 causes another D flip flop 79–3 to become set so that its Q output becomes a 1. This partially enables AND gate 79–4. On the next clock pulse after the T6 signal terminates or becomes a 0, the flip flop 79–2 will switch so that its $\bar{Q}$ output will now apply a 1 to the AND gate 79–4 so that its output becomes a 1. The output of AND gate 79–4 will remain a 1 for only one clock time since on the next clock pulse the flip flop 79–3 will also switch and thereby disable gate 79–4. It is during this one clock time that the output of AND gate 79–4 applied a 1 to the parallel enable (PE) terminal of register 78–1 and enables an AND gate 79–5 to pass a single clock pulse via an OR gate 79–6 to the CP clock terminal of register 78–1. This enables the register 78–1 to be loaded with the value which is being currently addressed to the memory 77–4.

When the timing signal T7 assumes a 1 value, an AND gate 79–7 is enabled to pass the clock signal $\phi$ via OR gate 79–6 to the clock input CP of the register 78–1 so as to clock the eight bit sampled data value serially out of the register. It is to be noted that at this time the output of AND gate 79–4 is a zero so as to place the register 78–1 in the serial output mode.

The serial output for the register 78–1 represents the magnitude of the phase vector. The sign of the vector is represented by the lease significant bit of the register 76–1. This sign in magnitude information is then converted into two's complement notation in the following manner. If the sign bit is zero (positive number), the serial data output for register 78–1 is passed as is by an Exclusive Or gate 78–2. For this case where sign bit is a 0, the Q output of a JK flip flop 78–4 provides a zero to the other input of the Exclusive Or gate 78–2. The JK flip flop 78–4 is placed in this condition (the clear condition) by the output of AND gate 79–4 at the time that the register 78–1 is loaded. On the other hand, when the sign bit is a 1 (a negative number), an AND gate 78–3 is enabled to respond to the first occurring 1 in the serial data output of register 78–1 to provide a 1 to the J input of the JK flip flop 78–4. On the next ensuing clock pulse, the JK flip flop 78–4 changes state such that its Q output now provides a 1 to the Exclusive Or gate 78–2. This causes the Exclusive Or 78–2 to complement the remaining bits in the output of the register 78–1. The addition of a 1 to the magnitude of the data output of register 78–1 occurs, since the circuit allows all zeroes occurring prior to the first one to pass in unaltered form to the output of Exclusive Or gate 78–2 which forms the output of the look up table module.

Referring next to FIG. 9, the serial sampled data output in the LUT 70 is clocked into an input register 96–1 contained in the input buffer 96 of the D/A converter and filter module 90. To this end, the timing section 99 includes an AND gate 99–1 which is enabled by the T7 timing signal to apply the clock signal $\phi$ to the CP shift terminal of the input register 96–1.

The timing section 99 also includes a D type flip flop 99–2 which receives the T7 timing signal at its D input. On the next clock pulse after the T7 signal attains a 1 value, flip flop 99–2 changes state so that its Q output becomes a 1 and its $\bar{Q}$ output becomes a 0. The $\bar{Q}$ output then acts to disable an AND gate 99–4 so long as the T7 signal remains a one. Another D type flip flop 99–3 receives the Q output of flip flop 99–2 at its D input. The Q output of flip flop 99–3 then also assumes the 1 state on the second clock pulse after T7 assumes a 1 value. When the T7 timing signal goes to zero, flip flop 99–2 responds to the next occurring clock pulse to switch so that its Q and $\bar{Q}$ outputs become 0 and 1, respectively. This causes AND gate 99–4 to be enabled. However, AND gate 99– 4 will be enabled to pass only one clock pulse since flip flop 99–3 will change its state on the next ensuing clock pulse.

The single clock pulse passed by AND gate 99–4 is employed to strobe the eight bit value from the input register 96–1 into a storage register 96–2. The storage register 96–2 is comprised of master slave type flip flops at each stage thereof such that the eight bit value applied to the parallel input of the register 96–2 will appear at its output only after the single clock pulse strobe occurs.

The eight bit output of the storage register 96–2 is applied to a D/A converter 92 which converts the eight bit digital value into an analog signal which is filtered by means of a low pass filter 93 to provide the synthesized sinusoidal wave, the frequency of which corresponds to the frequency setting on the BCD selector switches 10–1 (FIG. 5).

What is Claimed is:

1. The combination comprising:

a timing generator for producing a clock signal at a relatively high frequency and for producing at a lower frequency sequences of timing signals;

first and second modules, each including an input register, an output register, a function generator and a timing section;

the timing section of the first module including means responsive to a first of said timing signals and to said clock signal to load the first module input register with input data, second means responsive to said clock signal to enable the first module function generator to perform its function on said input data to provide a first result data and to load said first result data into said first module output register, and third means responsive to a second subsequent one of said timing signals and to said clock signal to read said first data result from said first module output register; and the timing section of said second module including first means responsive to said second timing signal and to said clock signal to load said first data into the second module input register, second means responsive to said clock signal to enable the second module function generator to perform its function on said first result data to produce second result data and to load said second result data into said second module output register, and third means responsive to said clock signal and to a third one of said timing signals subsequent to said second timing signal to read said second result data from said second module output register.

2. The invention set forth in claim 1 wherein the timing section first and third means of each said module respond to their corresponding timing signals and to said clock signal to load or read their corresponding registers serial by bit and parallel by byte.

3. The invention set forth in claim 2 wherein each timing signal has a duration of n clock signal cycles, where n is the number of bits in a byte; and wherein the second timing means of one of said modules also responds to the termination of the timing signal which caused its corresponding input register to be loaded, to establish a group of 2 *n* clock cycles which group is employed to load the corresponding data result in the corresponding output register.

4. The invention set forth in claim 3 wherein said first and second timing signals are separated in time by at least n clock cycles.

* * * * *